Figure 1:
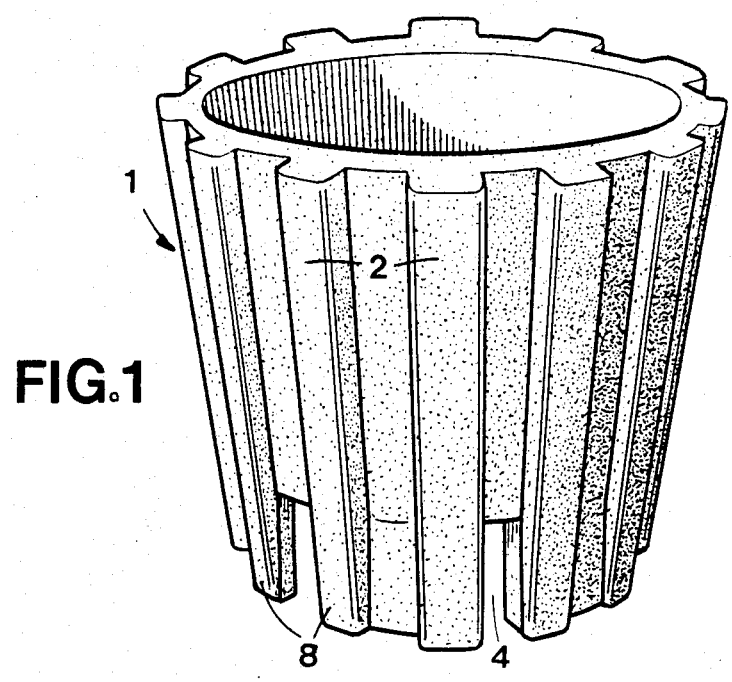

United States Patent [19]

Maillefer

[11] Patent Number: 4,667,439
[45] Date of Patent: May 26, 1987

[54] FOAM PLASTIC FLOWER POT

[76] Inventor: James Maillefer, 25/27 chemin Pétray, chemin Blémant, 1245 Collonge-Bellerive, (Geneva), Switzerland

[21] Appl. No.: 728,503

[22] Filed: Apr. 26, 1985

[30] Foreign Application Priority Data

Nov. 29, 1984 [CH] Switzerland ..................... 5693/84

[51] Int. Cl.$^4$ ............................................. A01G 9/02
[52] U.S. Cl. ......................................... 47/66; 47/81
[58] Field of Search ................ 47/59, 66, 77, 79–81, 47/66.81

[56] References Cited

U.S. PATENT DOCUMENTS

| 2,859,557 | 11/1958 | Lattuca | 47/66 |
| 2,863,259 | 12/1958 | Radford | 47/80 |
| 3,027,684 | 4/1962 | Keiding | 47/66 |
| 3,298,133 | 1/1967 | Courtright | 47/81 |
| 3,576,088 | 4/1971 | Arca | 47/81 |
| 3,785,088 | 1/1974 | Guarriello | 47/66 |
| 3,973,316 | 8/1976 | Maher | 47/73 X |
| 4,057,931 | 11/1977 | Stutelberg et al. | 47/66 |
| 4,205,485 | 6/1980 | Olsen | 47/77 |

FOREIGN PATENT DOCUMENTS

| 2139816 | 2/1973 | Fed. Rep. of Germany | 47/66 |
| 2904187 | 8/1980 | Fed. Rep. of Germany | 47/80 |
| 800066 | 6/1936 | France | 47/66 |
| 1452871 | 8/1966 | France | 47/81 |
| 1464181 | 11/1966 | France | 47/81 |
| 1468863 | 1/1967 | France | 47/81 |

Primary Examiner—James R. Feyrer
Attorney, Agent, or Firm—Anthony A. O'Brien

[57] ABSTRACT

A flower pot (1) is mounted on feet (8) intended to be disposed in a horticulture tank. The pot has a bottom portion (5) provided with pierced holes (7) and is also provided with parallel slots (6,6a). It is made in one piece of molded expanded polystyrene.

Application: the culture of plants placed in a pot with a reserve of water.

1 Claim, 4 Drawing Figures

FOAM PLASTIC FLOWER POT

The present invention has for its object, flower pots intended to be disposed in a horticultural tank and more particularly, in a tank used in hydroculture.

It is already known from Swiss Pat. No. 639,241 to provide a combination comprising a tank in which pots are disposed and in the interior of which a grill for supporting compost is mounted and the bottom of which is pierced with holes and is mounted on feet. However, the mounting of the grill in the pot and the cost of the grill itself are tedious and relatively burdensome.

In order to obviate these inconveniences, flower pots according to the present invention comprise a bottom pierced with holes and supported by feet and is characterized in that it is made in a single molded piece, the bottom further being provided with transverse parallel slots permitting the introduction therein of a capillary fabric intended to cover the pierced holes in the bottom of the pot.

The attached drawing shows schematically and by way of example, a preferred form of execution relating to the invention.

Figure 2:
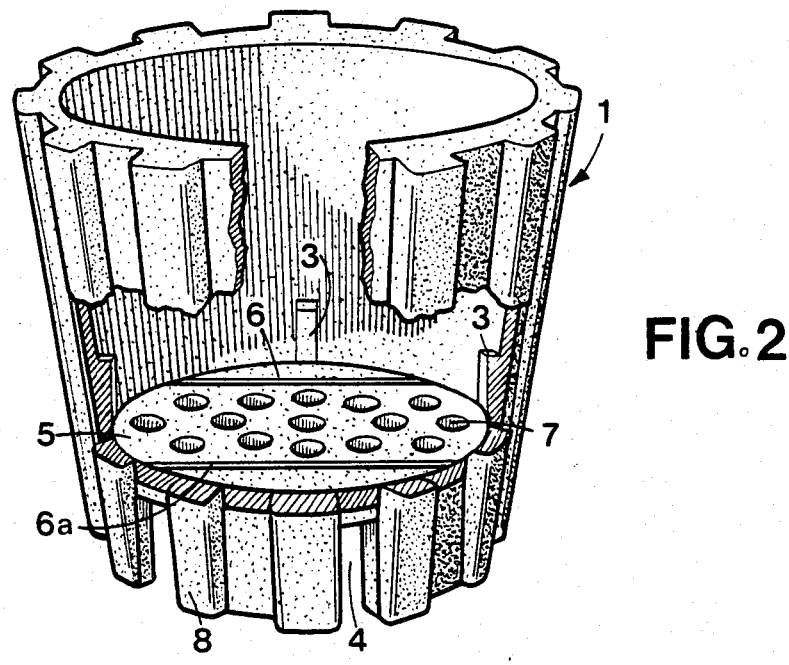
Figure 4:
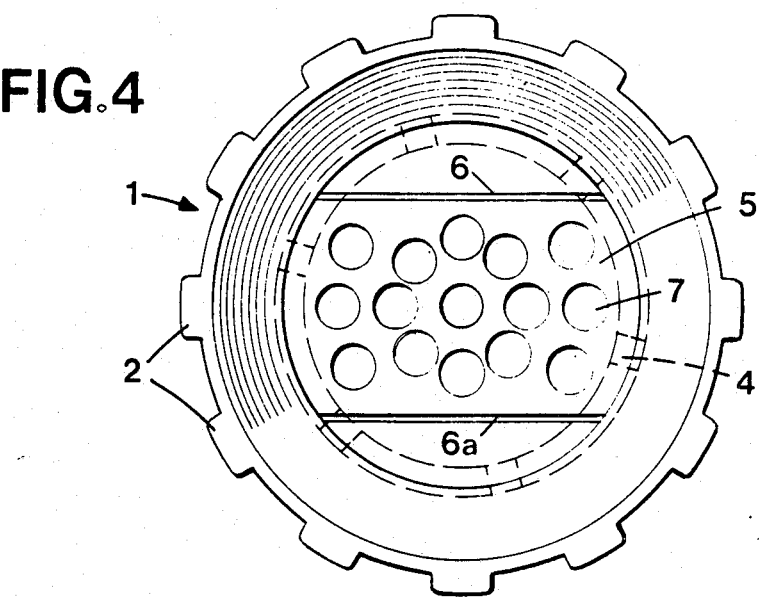
Figure 3:
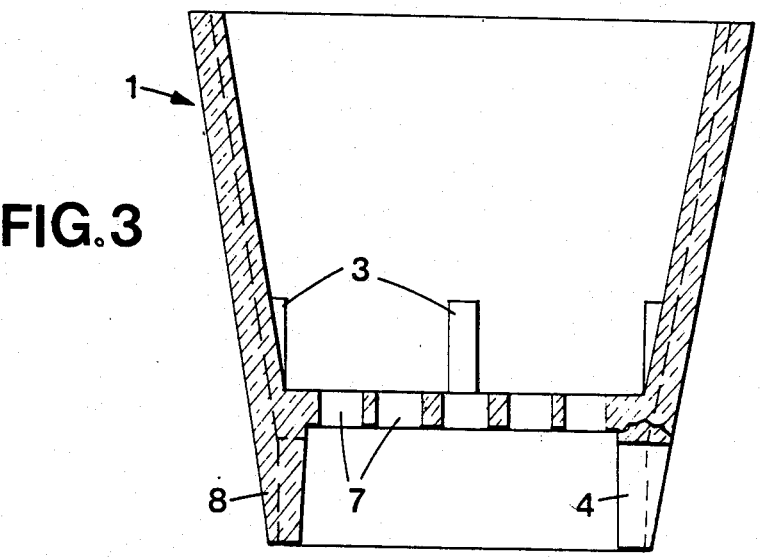

FIG. 1 is an elevational view;
FIG. 2 is an elevational view partly broken away;
FIG. 3 is a vertical sectional view of FIG. 1;
FIG. 4 is a top plan view.

Preferably, the pots 1 are of truncated conical shape and made of expanded polystyrene or any other plastic material such as, for example, a product sold under the name of "Sajex".

It is also preferable that the pots are reinforced by external ribs 2 and can be provided with internal supports 3 for stacking one within the other for packaging.

A plurality of ventilation openings 4 are arranged between at least certain pairs of the ribs 2 in the lower area forming base 8 of the pots 1.

The substantially elevated bottom 5 of the pots is provided with transverse parallel slots 6,6a to permit engagement therein of the edges of a capillary cloth (not shown) covering the holes 7 while soaking in water as provided in a tank or tray (not shown) within which the pot may be disposed.

With the foregoing in mind, it will be seen that the pot base 8 provides a plurality of legs projecting downwardly from the bottom 5 between each adjacent pair of ventilation openings.

While it is particularly advantageous to make the pots 1 of expanded polystyrene, in view of its cost and light weight, it is possible to make the pots of any other material such as terra cotta.

I claim:

1. A nestable flower pot, comprising:

said pot being molded from expanded polystyrene to form a unitary pot comprising sidewalls having a wholly frusto-conical shape and a flat bottom wall, for containing a plant with media;

said botton wall having a plurality of circular holes and a pair of parallel slots positioned on opposite sides of said plurality of holes, each of said slots extending through said bottom wall for receiving one end of a capillary cloth passed therethrough such that the cloth extends between said slots and across said plurality of holes, said slots having a length relative to said plurality of holes such that said holes are bound between said slots and extend the entire length across the bottom of said flower pot;

a base having a plurality of integral legs projecting downwardly from said bottom wall for supporting said bottom wall above the surface on which said base rests, and a plurality of openings extending radially through said base between each adjacent one of said legs for permitting water and air to circulate beneath said bottom wall to provide ventilation of the plant media through said holes in said bottom wall;

a plurality of reinforcing ribs integrally formed with said pot projecting radially outwardly and extending longitudinally along said sidewalls in alignment with said legs such that each said leg is reinforced by at least one of said ribs, said ribs each extending from the top to the bottom of said flower pot; and a plurality of integral stacking ribs projecting radially inwardly from said side walls and terminating in a common plane for supporting the base of a like pot nested within said pot.

* * * * *